United States Patent
Hongo et al.

(10) Patent No.: US 9,423,639 B2
(45) Date of Patent: Aug. 23, 2016

(54) WINDOW FOR DISPLAY DEVICE AND DISPLAY DEVICE INCLUDING THE WINDOW

(71) Applicant: Samsung Display Co., Ltd., Yongin, Gyeonggi-Do (KR)

(72) Inventors: Yuki Hongo, Yongin (KR); Ju-Suk Oh, Yongin (KR); Hyoung-Suk Roh, Yongin (KR); Hun-Kyo Kim, Yongin (KR)

(73) Assignee: Samsung Display Co., Ltd., Samsung-ro, Giheung-Gu, Yongin-si, Gyeonggi-Do (KR)

(*) Notice: Subject to any disclaimer, the term of this patent is extended or adjusted under 35 U.S.C. 154(b) by 106 days.

(21) Appl. No.: 13/864,788

(22) Filed: Apr. 17, 2013

(65) Prior Publication Data

US 2014/0170391 A1    Jun. 19, 2014

(30) Foreign Application Priority Data

Dec. 14, 2012    (KR) .................. 10-2012-0146680

(51) Int. Cl.
| | |
|---|---|
| B32B 3/00 | (2006.01) |
| B32B 3/30 | (2006.01) |
| B32B 17/10 | (2006.01) |
| G02F 1/1333 | (2006.01) |
| B32B 27/08 | (2006.01) |
| B32B 27/30 | (2006.01) |
| B32B 27/32 | (2006.01) |
| B32B 27/36 | (2006.01) |
| B32B 27/40 | (2006.01) |

(52) U.S. Cl.
CPC ............ *G02F 1/133308* (2013.01); *B32B 3/30* (2013.01); *B32B 27/08* (2013.01); *B32B 27/308* (2013.01); *B32B 27/325* (2013.01); *B32B 27/36* (2013.01); *B32B 27/365* (2013.01); *B32B 27/40* (2013.01); *B32B 2255/10* (2013.01); *B32B 2255/26* (2013.01); *B32B 2307/306* (2013.01); *B32B 2307/418* (2013.01); *B32B 2457/20* (2013.01); *G02F 2001/133331* (2013.01); *Y10T 428/24612* (2015.01)

(58) Field of Classification Search
None
See application file for complete search history.

(56) References Cited

U.S. PATENT DOCUMENTS

| | | | | |
|---|---|---|---|---|
| 6,207,266 | B1 * | 3/2001 | Kanbara et al. | 428/323 |
| 6,838,142 | B2 * | 1/2005 | Yang et al. | 428/40.1 |
| 7,112,359 | B2 * | 9/2006 | Dhar et al. | 428/64.4 |
| 2005/0238879 | A1 * | 10/2005 | Shoshi et al. | 428/412 |
| 2009/0015747 | A1 * | 1/2009 | Nishizawa et al. | 349/58 |

FOREIGN PATENT DOCUMENTS

| | | | | |
|---|---|---|---|---|
| JP | 2005-283611 | | 10/2005 | |
| JP | 2008-216429 | | 9/2008 | |
| JP | 2010-241138 | | 10/2010 | |
| KR | 10-2004-0023805 | | 3/2004 | |
| KR | 10-2011-0114506 | | 10/2011 | |
| WO | WO 99/24519 | * | 5/1999 | ........ B32B 17/10247 |
| WO | WO 2008/149890 | * | 12/2009 | ................ B32B 7/12 |
| WO | WO 2012/024217 | A1 * | 2/2012 | ................ C09J 4/00 |

* cited by examiner

*Primary Examiner* — David Sample
*Assistant Examiner* — Nicole T Gugliotta
(74) *Attorney, Agent, or Firm* — Robert E. Bushnell, Esq.

(57) ABSTRACT

Disclosed is a window for a display device that includes a first plastic substrate, a second plastic substrate disposed on one side of the first plastic substrate, and a bonding layer disposed between the first plastic substrate and second plastic substrate and bonding the first plastic substrate and the second plastic substrate, wherein the bonding layer has protrusions and depressions on a side in contact with the first plastic substrate.

10 Claims, 2 Drawing Sheets

WINDOW FOR DISPLAY DEVICE AND DISPLAY DEVICE INCLUDING THE WINDOW

CLAIM PRIORITY

This application makes reference to, incorporates the same herein, and claims all benefits accruing under 35 U.S.C. §119 from an application earlier filed in the Korean Intellectual Property Office on 14 Dec. 2012 and there duly assigned Serial No 10-2012-0146680.

BACKGROUND OF THE INVENTION

1. Field of the Invention

Aspects generally relate to a window for a display device and a display device including the same are disclosed.

2. Description of the Related Art

Currently-known display devices include a liquid crystal display (LCD), a plasma display panel (PDP), an organic light emitting diode display (OLED), a field emission display (FED), an electrophoretic display device, and the like.

The above information disclosed in this Related Art section is only for enhancement of understanding of the background of the invention and therefore it may contain information that does not form the prior art that is already known to a person of ordinary skill in the art.

SUMMARY OF THE INVENTION

One exemplary embodiments of the present invention provides a window capable of improving close contacting properties with a protective layer on a curved part thereof.

Another embodiment provides a display device including the window.

According to one embodiment, provided is a window for a display device that includes a first plastic substrate, a second plastic substrate disposed on one side of the first plastic substrate, and a bonding layer disposed between the first and second plastic substrates, wherein the bonding layer has protrusions and depressions on a side in contact with the first plastic substrate.

The bonding layer may have an arithmetic average roughness (Ra) of about 0.01 µm to about 0.80 µm at a side in contact with the first plastic substrate.

The bonding layer may have a refractive index of about 1.45 to about 1.60.

The bonding layer may include a binder matrix and a filler.

The binder matrix may include a polyester-based compound, an acryl-based compound, or a combination thereof.

The filler may include silica, alumina, titania, iron oxides, or a combination thereof.

The first plastic substrate may include polycarbonate, polymethylmethacrylate, a cyclic olefin polymer, a copolymer thereof, or a combination thereof.

The second plastic substrate may include a substrate film layer and a hard coating layer disposed on at least one side of the substrate film layer.

The substrate film layer may include polyethylene terephthalate.

The hard coating layer may include an acryl-based compound, an epoxy-based compound, or a combination thereof.

The hard coating layer may have a thickness of about 5 µm to about 150 µm.

The window for a display device may have surface haze of less than about 1.0%.

The first plastic substrate may have a thickness of about 400 µm to about 800 µm.

The second plastic substrate may have a thickness of about 50 µm to about 200 µm.

According to another embodiment, a display device including a display panel and the window for a display device disposed on one side of the display panel may be provided.

Therefore, the window is capable of maintaining close contacting properties with a protective layer on a curved part thereof.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1:
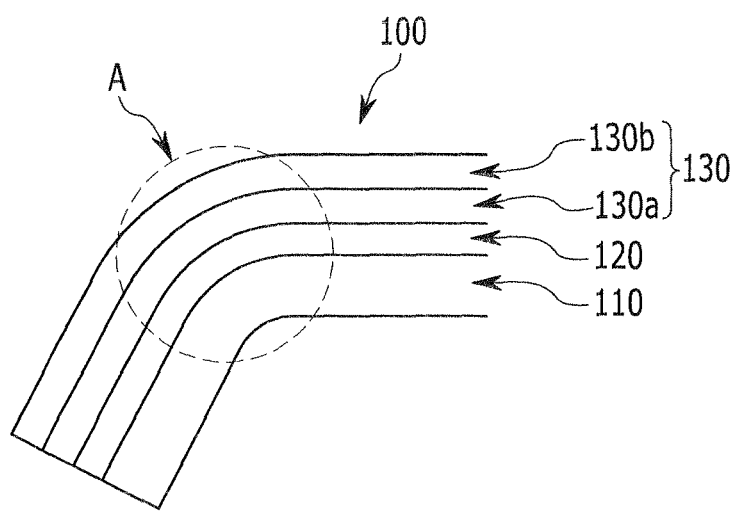
FIG. 1 is a cross-sectional view showing a part of a window for a display device according to one embodiment.

The example embodiments are described more fully hereinafter with reference to the accompanying drawings. The inventive concept may, however, be embodied in many different forms and should not be construed as limited to the example embodiments set forth herein. In the drawings, the sizes and relative sizes of layers and regions may be exaggerated for clarity.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like or similar reference numerals refer to like or similar elements throughout. As used herein, the term "and/or" includes any and all combinations of one or more of the associated listed items.

It will be understood that, although the terms first, second, third etc. may be used herein to describe various elements, components, regions, layers, patterns and/or sections, these elements, components, regions, layers, patterns and/or sections should not be limited by these terms. These terms are only used to distinguish one element, component, region, layer pattern or section from another region, layer, pattern or section. Thus, a first element, component, region, layer or section discussed below could be termed a second element, component, region, layer or section without departing from the teachings of example embodiments.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular example embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross sectional illustrations that are schematic illustrations of illustratively idealized example embodiments (and intermediate structures) of the inventive concept. As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing. The regions illustrated in the figures are schematic in nature and their shapes are not intended to illustrate the actual shape of a region of a device and are not intended to limit the scope of the inventive concept.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

A display device may include a display module displaying an image and a window panel protecting the display module.

The window may have various shapes, and for example, includes a curved shape for aesthetic sense.

However, the window may sometimes have an appearance defect on the curved part.

Figure 2:
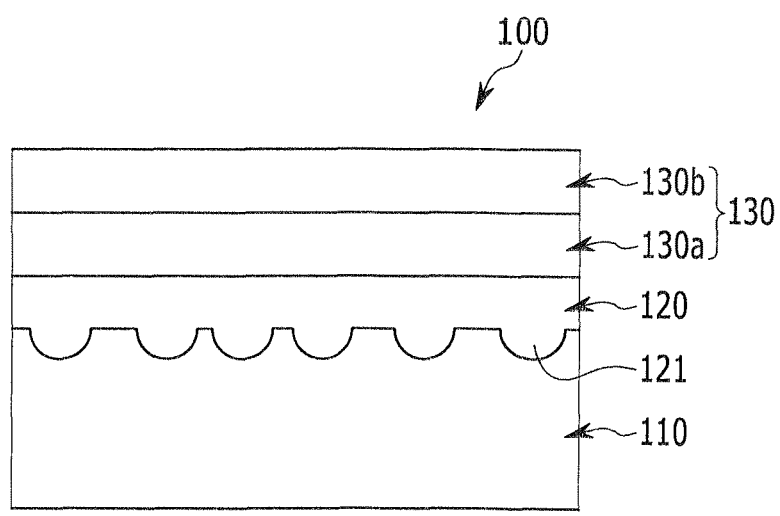
FIG. 2 is a cross-sectional view of an enlarged "A" part of FIG. 1.

Referring to FIGS. 1 and 2, a window for a display device will be described in accordance with an embodiment of this disclosure.

FIG. 1 is a cross-sectional view showing a part of a window for a display device, and FIG. 2 is a cross-sectional view of an enlarged "A" part of FIG. 1.

Referring to FIGS. 1 and 2, the window for a display device according to one embodiment includes a first plastic substrate 110, a second plastic substrate 130 disposed on one side of the first plastic substrate 110, and a bonding layer 120 disposed between the first plastic substrate 110 and second plastic substrate 130.

The first plastic substrate 110 may be made of a polymer compound, for example, polyimide, polyacrylate, polyethylene ether phthalate, polyethylene naphthalate, polycarbonate, polyarylate, polyetherimide, polyethersulfone, polymethylmethacrylate, triacetic acid cellulose, polyvinylidene chloride, polyvinylidene fluoride, cyclicolefin polymer, a copolymer thereof, or a combination thereof. In one embodiment, polycarbonate, polymethylmethacrylate, a cyclicolefin polymer, a copolymer thereof, or a combination thereof may be desirable in terms of heat resistance.

The first plastic substrate 110 may be molded to have various shapes through injection of a plastic resin.

The first plastic substrate 110 may be curved as shown in FIG. 1. Accordingly, the window for a display device 100 may have a curved shape. The window for a display device 100 has a curved shaped and thus may be applied to variously-shaped display devices.

The first plastic substrate 110 may have a thickness of about 400 μm to about 800 μm. When the first plastic substrate 110 has a thickness within the range, the window may not only be fabricated to be thin, but sufficiently protects a display panel.

The bonding layer 120 may be disposed between the first plastic substrate 110 and second plastic substrate 130, and has protrusions and depressions 121 on a side in contact with the first plastic substrate 110. The bonding layer 120 may have an arithmetic average roughness (Ra) of about 0.01 μm to about 0.80 μm at a side in contact with the first plastic substrate 110. In the specification, the arithmetic average roughness (Ra) is measured using a surface roughness meter (SV-C4500, Mitsutoyo Co.).

When the bonding layer 120 has an arithmetic average roughness within the range, the bonding layer 120 may not be released at the curved part of the first plastic substrate 110 and can maintain a close contacting property with the first plastic substrate 110.

The bonding layer 120 may have an arithmetic average roughness (Ra) of about 0.02 μm to about 0.50 μm at a side in contact with the first plastic substrate 110.

When the bonding layer 120 has an arithmetic average roughness (Ra) within the range, the bonding layer 120 may have a larger contact area with the first plastic substrate 110 and reinforce the close contacting property.

In other words, when the first plastic substrate 110 has a curved shape, the bonding layer 120 may have no hollow part on the bonding interface with the first plastic substrate 110, and thus improves the appearance of the window for a display device 100.

The bonding layer 120 may have a refractive index of about 1.45 to about 1.60. In the present specification, the refractive index is measured using an Abbe refractometer (DR-M2, ATAGO Inc.).

When the bonding layer 120 has a refractive index within the range, visibility and appearance quality of the window for a display device may be improved.

The bonding layer 120 may include a binder matrix and a filler. The kind and amount of the binder matrix and the amount of silica particles may be combined to adjust the refractive index and the arithmetic average roughness.

The binder matrix may include, for example, a polyester-based compound, an acryl-based compound, or a combination thereof, if the first plastic substrate 110 may be bonded with the second plastic substrate 130 without a particular limit.

The filler may be, for example, silica, alumina, titania, iron oxides, or a combination thereof, but is not limited thereto. When silica may be used as the filler, the silica may be desirable in terms of transparency.

The filler may have an average particle diameter of about 0.1 μm to about 5 μm. When the filler has an average particle diameter within the range, the bonding layer 120 may include filler particles having different diameters.

The second plastic substrate 130 may have a thickness of about 50 μm to 200 μm. When the second plastic substrate 130 has a thickness within the range, the window for a display device may be thin but not be curved.

The second plastic substrate 130 may include a substrate film layer 130a and a hard coating layer 130b disposed on at least one side of the substrate film layer 130a.

The substrate film layer 130a may be made of polyester, polyester urethane, polyethylene terephthalate, a copolymer thereof, or a combination thereof. When the polyethylene terephthalate among these materials may be included in the substrate film layer 130a, the substrate film layer 130a may improve heat resistance of the window for a display device and support the hard coating layer 130b.

The hard coating layer 130b may include an ultraviolet (UV) curable resin, for example, an acryl-based compound, an epoxy-based compound, or a combination thereof.

The hard coating layer 130b may be disposed on only one surface of the substrate film layer 130a. Herein, the substrate film layer 130a may be bonded with the bonding layer 120.

The hard coating layer 130b may be about 5 µm to about 150 µm thick. When the hard coating layer 130b has a thickness within the range, visibility and hardness of the surface of the window may be simultaneously secured.

The hard coating layer 130b may have surface hardness of greater than or equal to about 4H, and specifically about 4H to about 7H. Herein, the surface hardness is measured by using a pencil hardness tester (BMS Tech) and hanging a weight of 1 kg thereon.

The hard coating layer may be disposed on both surfaces of the substrate film layer (not shown). Herein, the coating layer disposed beneath the substrate film layer may be bonded with the bonding layer 120. The hard coating layers on and beneath the substrate film layer may be formed of different materials. For example, the upper hard coating layer may be formed of an acryl-based compound, and the lower hard coating layer may be formed of an epoxy-based compound.

The window for a display device may have surface haze of less than about 1.0%. Herein, the haze may be measured using a hazemeter (NDH-5000, Nippon Denshoku Industries Co. Ltd.). When the haze is within the range, the window may be prevented from deteriorating light transmittance.

Hereinafter, a method of manufacturing the window for a display device is illustrated.

First of all, a first plastic substrate may be prepared.

Next, a hard coating layer may be formed on at least one surface of a substrate film layer of a second plastic substrate. The hard coating layer may be formed by coating a hard coating solution on at least one surface of the substrate film layer, radiating ultraviolet (UV) rays thereon, and curing it.

Next, a bonding layer may be formed on one surface of the substrate film. The bonding layer may include a binder matrix and a filler as aforementioned.

Then, the second plastic substrate having the bonding layer on one surface may be pre-formed.

The first plastic substrate along with the pre-formed second plastic substrate may be injection-molded. The pre-formed second plastic substrate may be inserted in an injection molder to bond the first plastic substrate with the pre-formed second plastic substrate and fabricate a window having a desired shape.

The above-described window for a display device may be applied for various display devices.

The window for a display device may be disposed on a display panel, and the display panel may be a liquid crystal panel, an organic light emitting panel, a plasma display panel, an electric field emission display panel, an electrophoresis display panel, and the like.

The following examples illustrate the present invention in more detail. These examples, however, are not in any sense to be interpreted as limiting the scope of this disclosure.

Formation of Window for Display Device

Example 1

An acrylic resin may be coated on one surface of a 100 µm-thick polyethylene terephthalate (PET) (Cosmo-shine A4300, TOYOBO Ltd.) film, and then radiated by ultraviolet (UV) rays and cured.

Next, a mixture of an acrylic resin and silica particles may be coated to be 5 µm-thick on the other side of the PET film and dried. Herein, the coated PET film had a refractive index of 1.53 and arithmetic average roughness (Ra) of 0.05 µm.

On the other hand, a polycarbonate (PC) resin may be injection-molded to have a 600 µm-thick curved shape, and the PET film may be bonded thereon, fabricating a window for a display device.

Example 2

A window for a display device was fabricated according to the same method as Example 1, except for coating the mixture to have arithmetic average roughness (Ra) of 0.40 µm on the surface.

Example 3

A window for a display device was fabricated according to the same method as Example 1, except for using a polyester resin instead of the acrylic resin as a matrix of the mixture to have a refractive index of 1.59 and arithmetic average roughness (Ra) of 0.15 µm.

Example 4

A window for a display device was fabricated according to the same method as Example 1, except for coating the mixture to have a refractive index of 1.47 and arithmetic average roughness (Ra) of 0.15 µm on the surface and using a cyclic olefin polymer (COP) as an injection resin.

Example 5

A window for a display device was fabricated according to the same method as Example 1, except for coating the mixture to have a refractive index of 1.63 and arithmetic average roughness (Ra) of 0.20 µm on the surface.

Example 6

A window for a display device was fabricated according to the same method as Example 1, except for coating the mixture to have a refractive index of 1.53 and arithmetic average roughness (Ra) of 0.01 µm.

Example 7

A window for a display device was fabricated according to the same method as Example 6, except for coating the mixture to have arithmetic average roughness (Ra) of 0.60 µm on the surface.

Comparative Example 1

A window for a display device was fabricated according to the same method as Example 1 except for adding no silica particles.

Appearance Evaluation of Window for Display Device

Each window for a display device was evaluated regarding appearance by transmitting light into the curved part thereof under a background of a wavelength fluorescent lamp. The evaluation was performed according to the following reference.

Good: almost no line deformation on a curved part as a result of examination from a distance of 10 cm.

Average: line deformation on a curved part as a result of examination from a distance of 10 cm, but almost no line deformation on a curved part as a result of examination from a distance of 20 cm.

Bad: line deformation on a curved part as a result of examination from a distance of 20 cm.

Haze on the Surface of Hard Coating Layer

Each window for a display device was measured regarding haze using a hazemeter (NDH-5000, Nippon Denshoku Industries Co. Ltd.).

The appearance and haze results are provided in the following Table 1.

TABLE 1

|  | Bonding layer | | First plastic substrate | | | |
|---|---|---|---|---|---|---|
|  | Refractive index | Roughness (Ra, μm) | Kinds | Refractive index | Appearance | Haze (%) |
| Example 1 | 1.53 | 0.05 | PC | 1.57 | Good | 0.6 |
| Example 2 | 1.53 | 0.40 | PC | 1.57 | Good | 0.8 |
| Example 3 | 1.59 | 0.15 | PC | 1.57 | Good | 0.4 |
| Example 4 | 1.47 | 0.15 | COP | 1.50 | Good | 0.4 |
| Example 5 | 1.63 | 0.20 | PC | 1.57 | Good | 1.9 |
| Example 6 | 1.53 | 0.01 | PC | 1.57 | Average | 0.6 |
| Example 7 | 1.53 | 0.60 | PC | 1.57 | Good | 1.0 |
| Comparative Example 1 | 1.53 | 0.008 | PC | 1.57 | Bad | 0.5 |

Referring to Table 1, each window for a display device according to Examples 1 to 7 had a good appearance, while the window for a display device according to Comparative Example 1 had a bad appearance.

While this disclosure has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A window for a display device, comprising:
   a first plastic substrate;
   a second plastic substrate disposed on one side of the first plastic substrate; and
   a bonding layer disposed between the first plastic substrate and the second plastic substrate, the bonding layer has protrusions and depressions on a side in contact with the first plastic substrate, the bonding layer consists of a binder matrix and a filler, the binder matrix consists of a polyester-based compound, an acryl-based compound, or a combination thereof, and the filler consists of silica, alumina, titania, iron oxides, or a combination thereof, the bonding layer has an arithmetic average roughness (Ra) consisting of 0.20 μm to 0.35 μm at a side in contact with the first plastic substrate, the bonding layer has a refractive index of about 1.45 to about 1.60, and the window has a curved shape.

2. The window for a display device of claim 1, wherein a first plastic substrate comprises polycarbonate, polymethylmethacrylate, cyclicolefin polymer, a copolymer thereof, or a combination thereof.

3. The window for a display device of claim 1, wherein the second plastic substrate comprises a substrate film layer and a hard coating layer disposed on at least one side of the substrate film layer.

4. The window for a display device of claim 3, wherein the substrate film layer comprises polyethylene terephthalate.

5. The window for a display device of claim 3, wherein the hard coating layer comprises an acryl-based compound, an epoxy-based compound, or a combination thereof.

6. The window for a display device of claim 3, wherein the hard coating layer has a thickness of about 5 μm to about 150 μm.

7. The window for a display device of claim 1, wherein the window for a display device has surface haze of less than about 1.0%.

8. The window for a display device of claim 1, wherein a first plastic substrate has a thickness of about 400 μm to about 800 μm.

9. The window for a display device of claim 1, wherein the second plastic substrate has a thickness of about 50 μm to 200 μm.

10. A display device, comprising:
    a display panel; and
    a window for a display device disposed on one side of the display panel, said window comprising:
    a first plastic substrate;
    a second plastic substrate disposed on one side of the first plastic substrate; and
    a bonding layer disposed between the first plastic substrate and the second plastic substrate, the bonding layer has protrusions and depressions on a side in contact with the first plastic substrate, the bonding layer consists of a binder matrix and a filler, the binder matrix consists of a polyester-based compound, an acryl-based compound, or a combination thereof, and the filler consists of silica, alumina, titania, iron oxides, or a combination thereof, the bonding layer has an arithmetic average roughness (Ra) entirely consisting of 0.20 μm to 0.35 μm at a side in contact with the first plastic substrate, the bonding layer has a refractive index of about 1.45 to about 1.60, and the window has a curved shape.

* * * * *